United States Patent [19]

Bottoms et al.

[11] 4,085,830
[45] Apr. 25, 1978

[54] AUTOMATIC SLACK ADJUSTERS FOR VEHICLE BRAKES

[75] Inventors: Harry Simister Bottoms, Solihull; John Richard Archer, Wantage, both of England

[73] Assignee: Girling Limited, Birmingham, England

[21] Appl. No.: 726,119

[22] Filed: Sep. 24, 1976

[30] Foreign Application Priority Data

Oct. 3, 1975 United Kingdom ............ 40452/75

[51] Int. Cl.² .......................................... F16D 65/56
[52] U.S. Cl. ........................ 188/196 D; 188/79.5 GE
[58] Field of Search ......... 188/71.9, 79.5 GE, 79.5 P, 188/196 BA, 196 D, 196 F

[56] References Cited

U.S. PATENT DOCUMENTS

| 3,227,247 | 1/1966 | Sherretts et al. | 188/79.5 GE |
| 3,360,085 | 12/1967 | Belart | 188/79.5 GE |
| 3,610,374 | 10/1971 | Troyer | 188/196 BA |
| 3,811,538 | 5/1974 | Farr | 188/196 D |
| 3,822,003 | 7/1974 | Prange et al. | 188/196 BA |
| 3,838,757 | 10/1974 | Farr | 188/196 D |
| 3,878,923 | 4/1975 | Farr | 188/196 D |

*Primary Examiner*—Stephen G. Kunin
*Assistant Examiner*—Edward R. Kazenske
*Attorney, Agent, or Firm*—Scrivener, Parker, Scrivener and Clarke

[57] ABSTRACT

In an automatic slack adjuster for a vehicle brake, an adjuster member acts on a part of an adjustable strut assembly for maintaining a substantially constant braking clearance between a braking member and a rotatable braking surface, the adjuster member acting on the part through a driven ring, and an overload spring urges a clutch face on the driven ring into engagement with a complementary clutch face on the part so that the driven ring and the part are movable together unless the reaction between the clutch faces exceeds the loading of the overload spring whereafter the driven ring can rotate relative to the strut assembly to preclude adjustment.

6 Claims, 1 Drawing Figure

U.S. Patent  April 25, 1978  4,085,830
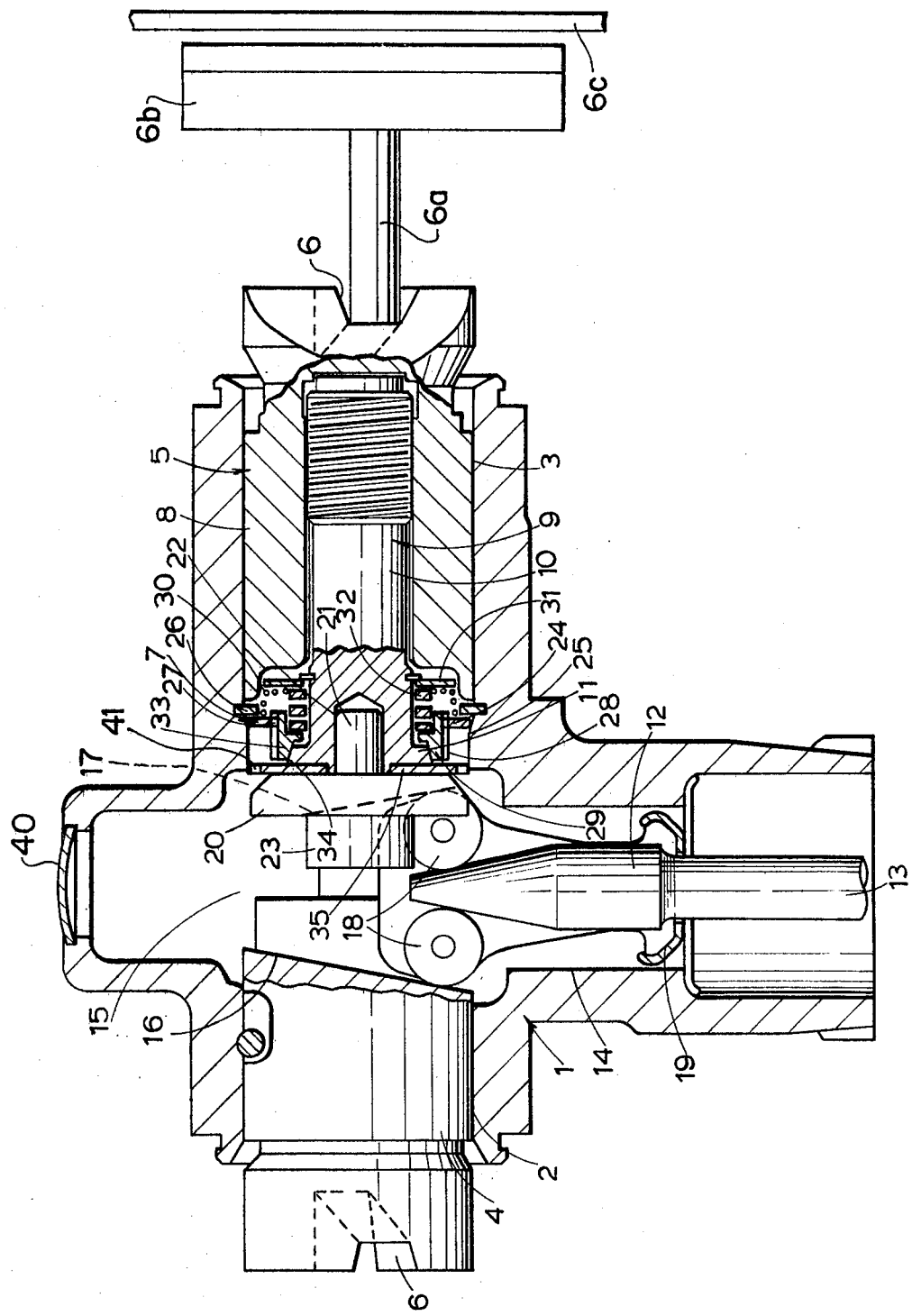

AUTOMATIC SLACK ADJUSTERS FOR VEHICLE BRAKES

SPECIFIC DESCRIPTION

This invention relates to automatic slack adjusters for vehicle brakes of the kind comprising a strut assembly of which the effective length is adapted to be increased automatically to maintain at a substantially constant value the braking clearance between a braking member and a rotatable braking surface and adjusting means for controlling the effective length of the strut assembly, the adjusting means comprising adjuster member engageable with a part of the strut assembly longitudinally in a brake applying direction after the said braking clearance has been taken up, and locking means for locking the adjuster member against movement with the strut assembly in the opposite brake releasing direction beyond a distance necessary to establish the said braking clearance, whereafter the engagement between the adjuster member and the said part causes the said part to rotate relative to the remainder of the strut assembly to increase the effective length of the strut assembly due to a screw-threaded engagement therebetween.

In known automatic slack adjusters of the kind set forth when the strut assembly is subjected to high loads, such as those experienced in a vehicle brake when subjected to a torque reversal which may occur during vehicle rollback when restarting on an uphill gradiant, the locking means becomes operative so that there is a tendency for the adjuster to operate. This is undesirable since excessively high loads applied to the adjuster may cause damage to the components of the adjuster, and particularly to the threaded engagement of parts of the strut assembly.

According to our invention in an automatic adjuster of the kind set forth for a vehicle brake the adjuster member acts on the said part of the strut assembly through a driven ring, and an overload spring urges a clutch face on the driven ring into engagement with a complementary clutch face on the said part so that the driven ring and the said part are movable together unless the reaction between the clutch faces exceeds the loading of the overload spring whereafter the driven ring can rotate relative to the strut assembly to preclude adjustment.

Thus the overload spring determines the loading at which the adjuster will cease to operate, which loading is higher than the loading to which the adjuster is subjected under normal service operations.

Conveniently the adjuster member comprises a drive ring which surrounds the driven ring and teeth in the inner peripheral edge of the drive ring mesh with complementary teeth in the outer peripheral edge of the driven ring, with a degree of lost-motion corresponding to the desired braking clearance, and the locking means comprise a releasable wedging engagement between the outer edge of the drive ring and a bore in a housing in which the strut assembly is urged in the brake releasing direction.

Preferably the longitudinal movement of the adjuster member with the strut assembly in the brake applying direction is limited by a stop.

This in turn, acts to limit movement of the said one part of the strut assembly on which acts an expander mechanism for a brake and, in consequence, limits operational movement of the expander mechanism, thereby ensuring that the expander mechanism cannot be damaged by excessive movement if operated accidentally with the adjuster and expander mechanism separated from the brake.

Preferably the said one part of the strut is provided with angularly spaced teeth or serrations with which a tool is engageable to enable the said one part to be rotated. Thus, the effective length of the strut assembly can be reduced normally to reset the adjuster when a braking member, for example a shoe, is to be replaced.

One embodiment of our invention will now be described by way of examples with reference to the accompanying drawing, which is a longitudinal section through an actuator for a vehicle internal shoe-drum brake incorporating an automatic slack adjuster.

The actuator illustrated in the drawing is of the wedge-type comprising a housing 1 adapted to be fixed to the back place of a shoe-drum brake between adjacent shoe ends and having a pair of aligned bores 2 and 3 in which works a pair of aligned tappets 4 and 5 for engagement at their outer ends with the ends of the shoes. Each tappet 4, 5 is provided at its outer end with slot 6 for receiving the web 6a of the shoe 6b with which the tappet engages for movement into engagement with a rotatable braking surface 6c.

The tappet 4 is of solid construction.

The tappet 5 comprises a two-part strut of which the effective length is adapted to be increased automatically by adjusting means 7.

The two part strut 5 comprises a hollow piston 8 working in the bore 3 and a thrust member 9 having a threaded stem 10 which is carried by an enlarged head 11 and has a threaded engagement in the piston 8.

The tappets 4 and 5 are adapted to be urged apart at their inner ends by means of a wedge 12 which is carried at the inner end of a rod 13. The wedge 12 extends through a bore 14 in the housing normal to the bores 2 and 3 and into a chamber 15 defined within the housing 1, between adjacent inner ends of the bores. The wedge 12 acts on inclined faces 16 and 17 at the inner ends of the tappets 4,5 through rollers 18 journalled for rotation in a cage 19. Since the piston 8 is held against rotation by the engagement of the shoe web in the notch 6, to permit the thrust member 9 to rotate relative thereto in order to increase the effective length of the tappet 5, the inclined surface 17 is provided in a thrust pad 20 engaging with the inner end of the thrust member 9 and provided with a spigot 21 which is rotatably received in a recess 22 in the head 11. The pad 20 is provided with ears 23 with which the cage 19 engages to retain the pad 20 against rotation.

The adjusting means 7 comprises an annular drive ring 24 located in a portion 25 of the bore 3 adjacent to the head 11 which portion is of frustoconical outline with the end of smaller diameter which is smaller than the external diameter of the ring 24 located adjacent to the thrust pad 20. An annular stop ring 26 is housed in the bore 3 at the end of greater diameter of the bore portion 25. The drive ring 24 is provided in its inner peripheral edge with teeth 27 meshing with complementary teeth 28 in an annular driven ring 29 surrounding the head 11, and a degree of lost-motion provided by back-lash equivalent to a desired braking clearance is provided between the teeth. The teeth may comprise helical gears or continuous screw-threaded engagements.

A light compression spring 30 is abutment at one end with an abutment 31 on the threaded stem 10 urges the drive ring 24 into an operative position in non-rotational wedging engagement with the bore portion 25. An overload compression spring 32 also abutting against the abutment 31 normally urges the driven ring 29 towards the thrust pad 20 to urge into engagement complementary clutch faces 33 and 34 provided respectively on the driven ring 29 and the head 11.

A toothed wheel 35 is keyed to the end of the head 11 adjacent to the thrust pad 20.

When the actuator is installed in an internal shoe-drum brake between adjacent shoe ends and the shoe webs are received in the notches 6, to apply the brake the wedge 12 is urged inwardly to separate the tappets 4 and 5 which, in turn, separate shoe-ends. In the tappet 5 the thrust from the web is transmitted from the thrust pad 20 onto the piston 8 through the thrust member 9 and the screw-threads between the threaded system 10 and the piston 8. As the thrust member 9 is moved axially in the brake applying direction the driven ring 29 is carried with it due to the engagement of the clutch faces 33 and 34.

Normally, the back-lash between the teeth 27 and 28 is sufficient to accommodate the brake applying movement so that the drive ring 24 remains in its operative position.

Should the back-lash be taken up, indicating that slack adjustment to compensate for lining wear is required, the drive ring 24 is carried axially with the thrust member 9 by the engagement of the teeth 27 and 28. When the brake is released, initial retraction of the tappets in response to the loading in the brake return spring permits the teeth 27 and 28 to disengage and the drive ring 24 to return to its operative position in non-rotational wedging engagement with the bore portion 25. Further retraction takes up the lost motion so that the teeth 27 and 28 re-engage. The final retraction of the tappets applies a thrust to the driven ring 29 and since the drive ring 24 is loaded against rotation by the spring 30 and the clutch faces 33 and 34 are engaged, the driven ring 29 rotates the thrust member 9 with it to increase the effective length of the tappet 5 since the piston 8 is also held against rotation.

The overload spring is of a strength chosen such that a reaction between the clutch faces 33, 34 is produced whereby the driven ring 29 and the thrust member 10 are movable or rotatable together. When a reaction between the clutch faces produced by a braking force greater than normal exceeds the reaction produced by the loading of the overload spring, then the clutching engagement between the clutch faces yields and the driven ring 29 is rotated by the drive member relative to the thrust member without effecting adjustment, the latter being resisted by the greater reaction caused by the frictional binding of the internal and external teeth on the piston 8 and thrust member 10, respectively, during a greater than normal brake application. Not only is unneeded and undesired adjustment prevented by clutch disengagement during these conditions, but damage to the adjuster is avoided.

The stop ring 26 is engaged by the drive ring 24 only in the event of movement of the tappet 5 in a brake applying direction beyond a normal brake-applying distance, for example, as can occur if the actuator is operated without the drum in position. Engagement of the drive ring 24 with the stop ring 26 prevents further outward movement of the tappet 5 which, if otherwise allowed, could cause the wedge 12, the rollers 18 and the cage 19 to be damaged through excessive inward movement of the wedge 12.

Upon shoe-replacement the length of the tappet 5 can be reduced by screwing-back the thrust member 9 by the use of a suitable tool applied to the wheel 35, the tool being inserted through the chamber 15 after a removable cap 40 has been removed and engaging with teeth 41 on the wheel 35 which is keyed to the head 11 of the tappet 5.

We claim:

1. An automatic slack adjuster for a vehicle brake, comprising a strut assembly including at least two parts, a driven ring surrounding one of said parts, adjusting means for controlling the effective length of said strut assembly, said adjusting means comprising an adjuster member acting on said one part through said driven ring, clutch faces provided on said driven ring and said one part, overload spring means urging said clutch faces into engagement so that a reaction between said clutch faces is produced and said driven ring and said part are movable together unless a reaction between said clutch faces exceeds the reaction produced by the loading of said overload spring, means allowing said driven ring to rotate relative to said strut assembly when the reaction exceeds the loading of said spring so as to preclude adjustment at this point, and locking means for locking said adjuster member against movement with said strut assembly in a brake releasing direction beyond a distance necessary to establish a desired braking clearance between a braking member and a rotatable braking surface in said brake, said adjuster member comprising a drive ring which surrounds said driven ring, teeth being provided in the inner peripheral edge of said drive ring, complementary teeth being provided in the outer peripheral edge of said driven ring, said teeth meshing with a degree of lost-motion corresponding to said desired braking clearance.

2. An automatic slack adjuster as claimed in claim 1, further comprising a housing having a bore in which said strut assembly is guided to slide, said locking means comprising a wedging engagement between the outer edge of said drive ring and said bore.

3. An automatic slack adjuster as claimed in claim 1, wherein stop means limit the longitudinal movement of said drive ring with said strut assembly in a brake applying direction.

4. An automatic slack adjuster as claimed in claim 1, wherein said one part of said strut assembly is provided with angularly spaced teeth, a tool being engageable with said teeth to enable said one part to be rotated on replacement of the braking member.

5. An actuator for a vehicle internal shoe drum brake comprising a housing having first and second aligned bores, a chamber between said bores, and a third bore normal to said aligned bores and adjoining said chamber, aligned tappets working in said aligned bores and engaging braking members at their outer ends, a wedge extending through said third bore into said chamber and acting on the inner ends of said tappets, one of said tappets comprising an automatic slack adjuster, said adjuster comprising a two part strut assembly, a driven ring surrounding one part of said strut assembly, adjusting means for controlling the effective length of said strut assembly, said adjusting means comprising an adjuster member acting on said one part through said driven ring, clutch faces provided on said driven ring and said one part, overload spring means urging said clutch faces into engagement so that a reaction between said clutch faces is produced and said driven ring and said part are movable together unless a reaction between said clutch faces exceeds the reaction produced by the loading of said overload spring, means allowing said driven ring to rotate relative to said strut assembly when the reaction exceeds the loading of said spring so as to preclude adjustment at this point, and locking means for locking said adjuster member against movement with said strut assembly in a brake releasing direction beyond a distance necessary to establish a desired braking clearance between a braking member and a rotatable braking surface in said brake, said adjuster member comprising a drive ring which surrounds said driven ring, teeth being provided in the inner peripheral edge of said drive ring, complementary teeth being provided in the outer peripheral edge of said driven ring, said teeth meshing with a degree of lost-motion corresponding to said desired braking clearance.

6. An automatic slack adjuster for a vehicle brake, comprising a strut assembly including at least a first outer part comprising a hollow member having a bore and a second inner part engaging in said bore, a driven ring surrounding said second part, adjusting means for controlling the effective length of said strut assembly, said adjusting means comprising a drive ring acting on said second part through said driven ring, said drive ring surrounding said driven ring, teeth being provided in the inner peripheral edge of said drive ring, complementary teeth being provided in the outer peripheral edge of said driven ring, said teeth meshing with a degree of lost-motion, clutch faces provided on said driven ring and said second inner part, overload spring means normally urging said clutch faces into engagement so that said driven ring and said part are movable together, said engagement causing a reaction force between said faces when the brake is applied, means allowing said driven ring to rotate relative to said strut assembly when a reaction force between the clutch faces exceeds the reaction produced by the loading of said spring so as to preclude adjustment at this point, and said drive ring being axially movable with said strut assembly within predetermined limits, said limits comprising locking means for locking said drive ring against movement with said strut assembly in a brake releasing direction beyond a distance necessary to establish a desired braking clearance between a braking member and a rotatable braking surface in said brake, and stop means limiting the longitudinal movement of said drive means with said strut assembly in a brake applying direction.

* * * * *